(12) United States Patent
Salimi et al.

(10) Patent No.: US 11,931,976 B2
(45) Date of Patent: *Mar. 19, 2024

(54) SEMI-AUTOMATED LAYUP PROCESS FOR FABRICATION OF WIND TURBINE BLADES USING LASER PROJECTION SYSTEM

(71) Applicant: TPI Composites, Inc., Warren, RI (US)

(72) Inventors: Amirhossein Salimi, Providence, RI (US); Carlos Ramirez, Missouri City, TX (US)

(73) Assignee: TPI COMPOSITES, INC., Warren, RI (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/147,274

(22) Filed: Dec. 28, 2022

(65) Prior Publication Data

US 2023/0133820 A1 May 4, 2023

Related U.S. Application Data

(63) Continuation of application No. 17/322,362, filed on May 17, 2021, now Pat. No. 11,541,614, which is a
(Continued)

(51) Int. Cl.
*B29C 70/54* (2006.01)
*B29C 70/38* (2006.01)
(Continued)

(52) U.S. Cl.
CPC ............ *B29C 70/38* (2013.01); *B29C 70/541* (2013.01); *B29D 99/0028* (2013.01); *B29C 2945/76461* (2013.01); *B29L 2031/085* (2013.01)

(58) Field of Classification Search
CPC .............................. B29C 70/541; B29C 70/38
See application file for complete search history.

(56) References Cited

U.S. PATENT DOCUMENTS 3,992,240 A 11/1976 Kuehn, Jr.
4,861,406 A 8/1989 Baker et al.
(Continued)

FOREIGN PATENT DOCUMENTS

CN 102076485 A 5/2011
WO WO-1998/50827 A2 11/1998
(Continued)

OTHER PUBLICATIONS

Extended European Search Report for European Application No. EP 18894333 dated Aug. 26, 2021.
(Continued)

*Primary Examiner* — Robert B Davis
(74) *Attorney, Agent, or Firm* — Stephen J. Kenny; Jialan (Flora) Zhang; Foley Hoag LLP (57) ABSTRACT

A system for fabrication of a wind turbine blade including a laser projection which identifies the dimensions for a plurality of layup segments; determines the sequence of layup segments within first and second sections of the mold, wherein the sequence of layup segments within the second section of the mold are synchronized with the layup segments within a first section of the mold. The system also includes a projection device visually depicting the boundaries of a plurality of layup segments onto the mold. This system automates fabrication of composite structures by setting a pace for each task and ensuring operators complete each task within the allotted period. The projection system and layup delivery mechanism can advance with respect the mold to ensure the pace is maintained and an overall product cycle time is adhered to.

22 Claims, 4 Drawing Sheets

Related U.S. Application Data continuation of application No. 16/235,325, filed on Dec. 28, 2018, now Pat. No. 11,007,727.

(60) Provisional application No. 62/611,803, filed on Dec. 29, 2017.

(51) Int. Cl.
  *B29D 99/00* (2010.01)
  *B29L 31/08* (2006.01)

(56) References Cited

U.S. PATENT DOCUMENTS

| | | |
|---|---|---|
| 6,000,801 A | 12/1999 | Dillon et al. |
| 6,843,565 B2 | 1/2005 | Evans et al. |
| 7,080,441 B2 | 7/2006 | Braun |
| 8,709,314 B2 | 4/2014 | Mahieu et al. |
| 9,599,094 B2 | 3/2017 | Dahl et al. |
| 11,007,727 B2 | 5/2021 | Salimi et al. |
| 11,541,614 B2 | 1/2023 | Salimi et al. |
| 2007/0236354 A1 | 10/2007 | Green |
| 2011/0221093 A1 | 9/2011 | Perrow et al. |
| 2013/0014889 A1 | 1/2013 | Miller et al. |
| 2016/0121556 A1 | 5/2016 | Spellman et al. |
| 2016/0297171 A1 | 10/2016 | Bolsee |
| 2017/0041582 A1 | 2/2017 | Kaufman et al. |
| 2019/0001589 A1 | 1/2019 | Salimi et al. |
| 2021/0268751 A1 | 9/2021 | Salimi et al. |
| 2023/0133820 A1 | 5/2023 | Salimi et al. |

FOREIGN PATENT DOCUMENTS

| | | |
|---|---|---|
| WO | WO-1999/022932 A1 | 5/1999 |
| WO | WO-2019/133832 A1 | 7/2019 |

OTHER PUBLICATIONS

International Search Report and Written Opinion for International Application PCT/US18/67896 dated Mar. 22, 2019.

SEMI-AUTOMATED LAYUP PROCESS FOR FABRICATION OF WIND TURBINE BLADES USING LASER PROJECTION SYSTEM

CROSS-REFERENCE TO RELATED APPLICATIONS

This application is a Continuation of and claims the benefit of priority under 35 USC 120 to U.S. application Ser. No. 17/322,362 filed May 17, 2021, which is a Continuation of and claims the benefit of priority under 35 USC 120 to U.S. application Ser. No. 16/235,325 filed Dec. 28, 2018, which claims the benefit of priority under 35 U.S.C. § 119(e) of U.S. Provisional Application No. 62/611,803 filed Dec. 29, 2017. The entire contents of each application is hereby incorporated by reference.

FIELD OF THE DISCLOSED SUBJECT MATTER

The disclosed subject matter relates to a system for manufacturing composite structures. Particularly, the disclosed subject matter is directed to a system and corresponding method of manufacturing wind turbine blades. Particularly, the present disclosed subject matter converts the traditional layup process in wind blade manufacturing to a semi-automated assembly line-type process. The system disclosed herein includes an optical (e.g. laser) projection system, which provides the adjustment, and control, of the production pace and facilitates the implementation of standard work as a lean manufacturing tool.

SUMMARY OF THE DISCLOSED SUBJECT MATTER

The purpose and advantages of the disclosed subject matter will be set forth in and apparent from the description that follows, as well as will be learned by practice of the disclosed subject matter. Additional advantages of the disclosed subject matter will be realized and attained by the methods and systems particularly pointed out in the written description and claims hereof, as well as from the appended drawings.

To achieve these and other advantages and in accordance with the purpose of the disclosed subject matter, as embodied and broadly described, the disclosed subject matter includes a system for fabrication of a composite structure comprising a mold, the mold having a contoured surface; a layup projection generator, which: defines a plurality of mold sections; identifies the dimensions for a plurality of layup segments; specifies the sequence of layup segments within a first section of the mold; and specifies the sequence of layup segments within a second section of the mold, the sequence of layup segments within the second section of the mold synchronized with the layup segments within a first section of the mold. The system also includes a projection device visually depicting the boundaries of a plurality of layup segments onto the mold; and a layup delivery mechanism delivering a layup segment to at least one section of the mold.

In some embodiments, the projection device simultaneously depicts the boundaries of a plurality of layup segments onto the mold. In some embodiments, the projection device sequentially depicts the boundaries of each layup segment onto the mold.

In some embodiments, a first section of the mold defines the root portion of a wind turbine blade and a second section of the mold defines the tip portion of a wind turbine blade.

In some embodiments, a density of layup segments in a first section of the mold is higher than the density of layup segments in a second section of the mold.

In some embodiments, the layup delivery mechanism for layup segments of the first section of mold is different from the layup delivery mechanism for layup segments of the second section of the mold.

In some embodiments, the layup projection generator is disposed above the mold, and the layup projection generator and mold are configured for relative movement.

In some embodiments, the projection device projects the boundaries of layup segments via an optical laser.

The disclosed subject matter includes a method of manufacturing a composite structure comprising: providing a mold, the mold having a contoured surface; providing a layup projection generator, with the layup projection generator: defining a plurality of mold sections; identifying the dimensions for a plurality of layup segments; specifying the sequence of layup segments within a first section of the mold, the sequence of layup segments within the first section of the mold configured as series of sub-tasks, each sub-task having a start and end, with an endpoint of the first sub-task occurring prior to start of the next sequential sub-task; specifying the sequence of layup segments within a second section of the mold, the sequence of layup segments within the second section of the mold synchronized with the layup segments within a first section of the mold; projecting the boundaries of a plurality of layup segments onto the mold; and delivering a layup segment to at least one section of the mold.

In some embodiments, a first section of the mold defines the root portion of a wind turbine blade and a second section of the mold defines the tip portion of a wind turbine blade.

In some embodiments, layup segments within the first section of the mold are projected at a faster rate than layup segments within the second section of the mold.

In some embodiments, each layup segment within the first section of the mold includes a unique boundary projection. In some embodiments a plurality of layup segments within the second section of the mold remain projected onto the second mold section throughout at least two sub-tasks of a sequence within the first section of the mold.

In some embodiments, sequence of layup segments are predefined time intervals. Additionally, the cycle time for manufacturing the composite structure can be defined based on the sequence of layup segments.

The In some embodiments, the layup projection generator is disposed above the mold with the layup projection generator and mold configured for relative movement.

It is to be understood that both the foregoing general description and the following detailed description are exemplary and are intended to provide further explanation of the disclosed subject matter claimed.

The accompanying drawings, which are incorporated in and constitute part of this specification, are included to illustrate and provide a further understanding of the method and system of the disclosed subject matter. Together with the description, the drawings serve to explain the principles of the disclosed subject matter.

BRIEF DESCRIPTION OF THE DRAWINGS

A detailed description of various aspects, features, and embodiments of the subject matter described herein is provided with reference to the accompanying drawings, which are briefly described below. The drawings are illustrative and are not necessarily drawn to scale, with some components and features being exaggerated for clarity. The drawings illustrate various aspects and features of the present subject matter and may illustrate one or more embodiment(s) or example(s) of the present subject matter in whole or in part.

DETAILED DESCRIPTION OF AN EXEMPLARY EMBODIMENT

Reference will now be made in detail to exemplary embodiments of the disclosed subject matter, an example of which is illustrated in the accompanying drawings. The method and corresponding steps of the disclosed subject matter will be described in conjunction with the detailed description of the system.

Extracting the kinetic energy of the wind and transferring it to the power generators, blades are one of the most critical components of wind turbine systems. As geometry, structural strength and weight of the blades directly impact the efficiency of the turbine system, designers are continuously attempting to excel the aerodynamic characteristics of the blades while increasing the length and lowering the weight of the structure. To keep up with this dynamic design environment, fabrication methods are necessitated to undergo tremendous continuous improvements as well. Employing the new emerging manufacturing technologies along with implementation of lean manufacturing techniques, the ultimate objectives of wind turbine blade manufacturers are improving the quality of blades while increasing the productivity and efficiency.

An assembly line-type operation is a semi-automated process in which sub-tasks are executed in a sequential manner to create an end product. From manufacturing to product development and even management, this methodology is being vastly employed to increase throughput. An aspect of the disclosed subject matter is to introduce and detail a novel system that improves wind blade manufacturing with unique assembly line methodology. Utilizing projection technology (e.g. 3D lasers strategically positioned along the mold) the disclosed system converts the traditional fully-manual overlapping layup process into a semi-automated assembly line-type operation. As the result of this approach, the layup processes will transition from procedural to sequence mode where it consists of a set of tasks next to each other in a set order. The advantages of this arrangement is could be seen in a wide range from quality to cycle time, productivity, communication and material flow.

Manufacturing composite wind turbine blades using resin infusion method consists of three main steps; layup, infusion and mold closure. The former—layup—which happen to be the most human resource intense step has the most significant impact on the quality of the final product. In this set of sub-processes, variety of different reinforcement and core materials are placed inside the molds, prior to infusion process begins. Optimizing this step provides significant improvements in both quality and productivity. The purpose of the current disclosed subject is to introduce a system and corresponding method to achieve this goal.

In traditional layup process, following the work instruction procedures, production associates place the reinforcement layers in various mold locations. In this procedural approach, the key element is to maintain the labor balance and allocate the optimized work forces for each sub-task. Due to the fact that production associates are under constraint in this type of procedural operations, it is extremely challenging to enforce the practice of standard work procedures and hence, it is difficult to trace the quality issues which makes the root-cause analysis a tedious task. Consequently, this variability creates deviations in manufacturing operations, which can compromise the structural integrity and performance of the blade.

Figure 1:
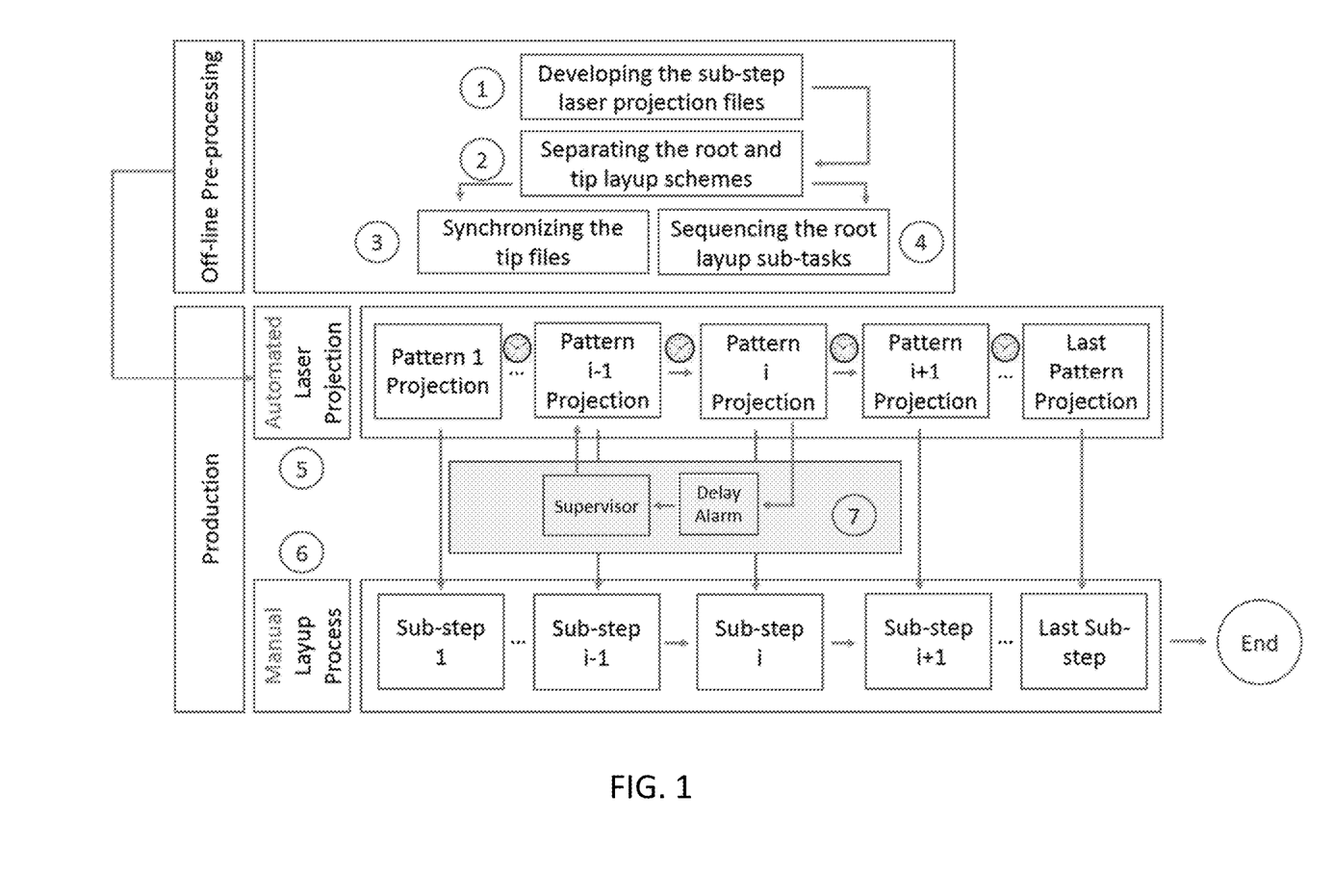
FIG. 1 is a schematic representation of the Semi-Automated Layup Process for Fabrication of Wind Turbine Blades using Laser Projection System in accordance with the disclosed subject matter.

In accordance with an aspect of the present disclosure, the laser projection files for all the layup patterns are generated (FIG. 1 step 1). A layup pattern can consist of a single layup segment, or a plurality of layup segments which can be joined along one or more borders/boundaries of adjacent segments. Also, the blade root section includes more layup segments than the tip section, and often with a more complex geometry. For example, the root section often includes load bearing components (e.g. root inserts), with a greater radius of curvature than layup segments of the tip section. While root section includes all the major structural layers, tip elements are mainly composed of local reinforcement layers for lifting and positioning purposes (FIG. 2)

Figure 2:
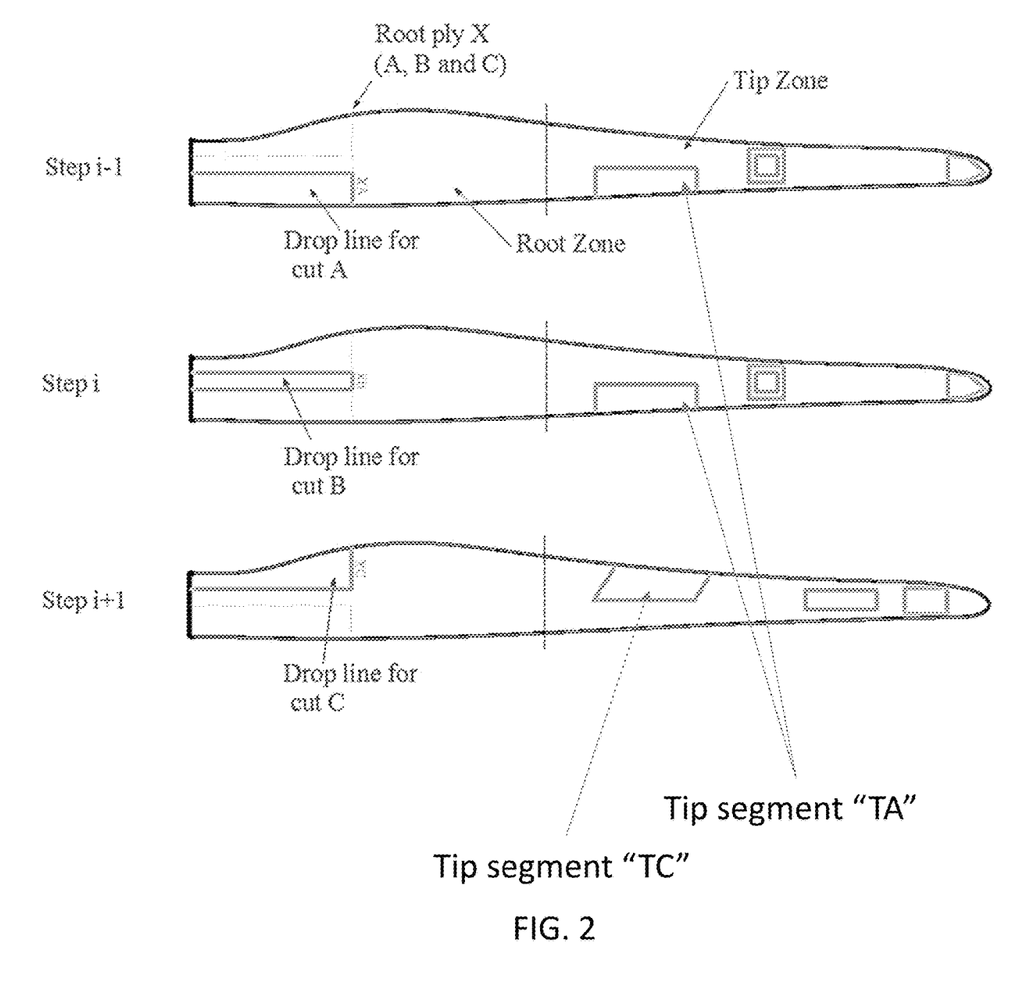
FIG. 2 is a schematic representation of an exemplary embodiment of the present disclosure, depicting a with various layup segments projected within a wind turbine blade mold.

Thus, since the density of the reinforcement layers in the vicinity of the blade root is higher, in some embodiments of the presently disclosed subject matter, each mold and its corresponding reinforcement materials are divided (FIG. 1, step 2) into two separate sections or regions; e.g., root and tip (dashed line in FIG. 2). An exemplary line of division is shown in FIG. 2 is at approximately mid-span, thus depicting the root section and tip section as approximately equivalent in length. However, it is to be understood that the division of first (e.g. root) and second (e.g. tip) sections can be scaled as desired, depending on the varied complexity of each section. Also, the blade can be divided into any number of sections as needed to track the varying complexity of layup segments along the blade length. In other words, the system can employ any number of sections needed to accommodate the changing layup density, or gradient, along the blade span.

In accordance with another aspect of the present disclosure, layup tasks in the root section are defined with a predetermined time interval for completion. In some embodiments, this predetermined time interval is based on standard work guidelines (e.g. average time for completion across a given number of employees). Additionally or alternatively, the system can be trained, e.g. via a machine learning algorithm to establish the sequence of layup projections. For example, each task can be performed manually with the completion time recorded for each task. This can be performed numerous times and while varying parameters for each iteration, e.g., number of operators, shift (morning vs. evening), layup material type, blade model, etc. As a result, a particular duration (e.g., mean, median, etc.) can be set as the sequence time period for each layup projection. Additionally, and in conjunction with the sequence time determination, the dimensions of each layup segment to be positioned within the root section is identified.

In an exemplary embodiment, layup tasks in the root section are sequenced as series of closed sub-tasks where no two steps overlap with each other (FIG. 1 step 4). Each sub-task is defined with a start point and an end point, with an endpoint of a first sub-task occurring prior to start of the next sequential sub-task. In some instances, the end point of a first task can coincide with a start point for the next sequential sub-task. An exemplary sub-task is the process of laying up each unique piece of reinforcement layer in the root section of the blade. In contrast, sub tasks that follow each other may or may not share identical projection within the tip section, as described in further detail herein.

In some embodiments, the tip section layup tasks can be defined in parallel with the sequencing of tasks within the root section (FIG. 1 step 3). The tip section layup tasks can be designed to take place with slower pace since the layup segments disposed within this section of the mold are typically less dense, and thus less burdensome and time consuming to complete as compared to the root section. To optimize efficiencies, the sequence of layup segments within the tip section of the mold are synchronized with the layup segments within the root section of the mold such that the sequence of root layup segments is completed at the same time the sequence of tip layup segments is completed. For example, in an embodiment in which there are 10 projections in the root section and only 5 projections in the tip section (wherein each task requires an equal time to complete) each projection in the tip section correlates with (i.e. throughout the duration of) 2 projections in the root section. In this scenario, there will be a total of 10 subtasks (equal to the number of layup projections) within the root section. The root section layup and tip section layup begin and end in unison (with the root section having undergone twice as many tasks/layups). Eventually, the entire layup process ends, when all the sequences in the root section layup are completed.

Once the sequencing tasks described above are completed (which can include defining: layup duration, location and order of installation), an overhead optical system is utilized to project (e.g. via laser) the layup pattern for each step (FIG. 1 step 5). An exemplary optical system is provided in U.S. application Ser. No. 16/023,891, the entire contents of which are hereby incorporated by reference. In some embodiments, a single overhead projection device can be employed to visually depict the layup patterns along the entire blade span. In some embodiments, a plurality of overhead projection devices can be employed to visually depict the layup patterns with a sub-set of projection devices dedicated to a select section. In some embodiments the subset of projection devices is evenly distributed about the various mold sections (e.g. 1 projection device for the root section; and 1 projection device for the tip section). In other embodiments, a higher concentration of projection devices can be employed about the root section of the mold than the tip section of the mold since the root section requires a more dense and complex layup configuration. In some embodiments, approximately 4-5 projection devices are employed about the root section of the mold, and approximately 3-4 projection devices are employed about the tip section of the mold. Additionally, the projection device(s) can be configured for relative movement (e.g. rotation and/or translation along any or all of the X, Y, Z-axes) with respect to the mold sections. Also, each layup projection device can be configured for independent movement relative to each other.

In accordance with an aspect of the present disclosure, a unique projection file can be mapped to each layup pattern in the root section. FIG. 2 illustrates an exemplary embodiment of the present disclosure, depicting three projection files (Step i−1, Step i, and Step i+1) within the root section, with each layup segment (XA, XB and XC, respectively) shown to have a unique dimension/boundary. Due to the size of the root section, reinforcement layers are not typically laid all as one piece. Instead root section layup segments are sectioned in the chord-wise direction (with 3 sections depicted in the illustrated embodiment: XA, XB and XC). These root sections and whether they are on the leading edge side or trailing edge side drive the sequencing of the layup process. The red lines depict the boundary of each segment.

In contrast, a plurality of projection files share the identical layup pattern in the tip section to compensate for the lower number of layers in the tip compared to the root. FIG. 2 illustrates an exemplary embodiment of the present disclosure, depicting three projection files (Step i−1, Step i, and Step i+1) within the tip section, with two layup patterns, e.g. tip segment "TA" (see borders shown in Step i−1 and Step i) shown to have a common dimension/boundary. In some embodiments, this common layup pattern within the tip section repeats based on a fixed number of intervening patterns projected. In some embodiments, this common layup pattern repeats in a non-uniform manner. In the exemplary embodiment depicted in FIG. 2, only a single layup segment is projected within the root section of the mold during any given step. Thus, only layup segment XA is projected during step i−1 in the root section, only layup segment XB is projected during step i in the root section; only layup segment XC is projected during step i+1 in the root section.

Conversely, the tip section can maintain a common layup projection across multiple steps. For instance, tip segment TA can be projected within the tip section during step i−1, and this same segment TA can remain projected during step i as well. When a subsequent layup segment is to be projected within the tip section, this subsequent layup segment, e.g. TC, is projected in step i+1 (and the previously projected segment TA is removed as it is expected to have been completed).

In some embodiments the root section can have only a single layup segment projected during any step/task; whereas the tip section can have a plurality (e.g. up to 4) projections depicted during a single step/task. This configuration is advantageous in that it allows for a reduction in workforce allocation in this section of the mold (FIG. 2). The projection device changes the sequenced process to semi-automated operation where operators are tasked to execute the manual layup process while keeping up with the projection pace (FIG. 1 step 6).

Additionally or alternatively, in some embodiments the projection of the layup patterns can be performed simultaneously (i.e. all at once), or the patterns can be selectively and discretely projected one at a time. Additionally, when in the select pattern depiction mode, switching from one pattern to another can be performed, e.g., by a remote controller.

Furthermore, the presently disclosed system includes a layup delivery mechanism for delivering each layup segment to the mold. In some embodiments, a plurality of layup segments are delivered to the mold in bulk, whereas other embodiments deliver the layup segment on an as-needed or just-in-time schedule. In some embodiments a plurality of layup delivery mechanisms (e.g. conveyor systems) can be employed, with one dedicated for the tip section and one dedicated for the root section. The layup delivery mechanisms can be configured to move with respect to the blade mold, e.g. parallel to the blade span. Additionally, in some embodiments the layup delivery mechanism can traverse the blade in a chord-wise direction to facilitate dispensing of the layup segment directly into its designated/projected position within the mold.

Figure 3A:
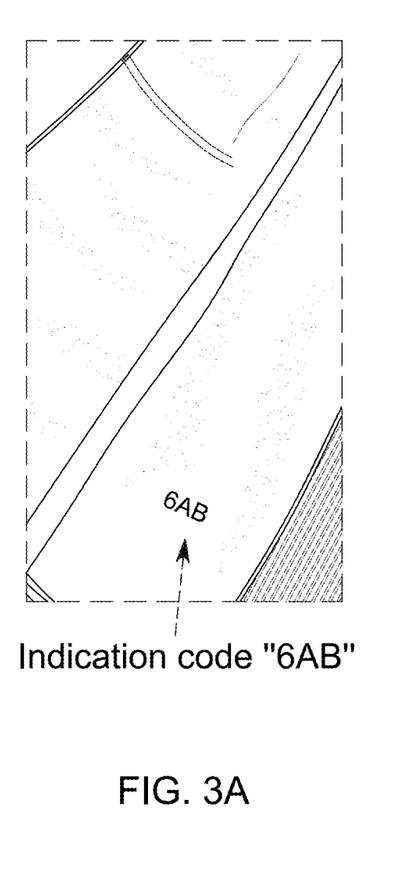
FIGS. 3A-C are images of a layup segment deposited within a mold with a layup label projected thereon.
Figure 3B:
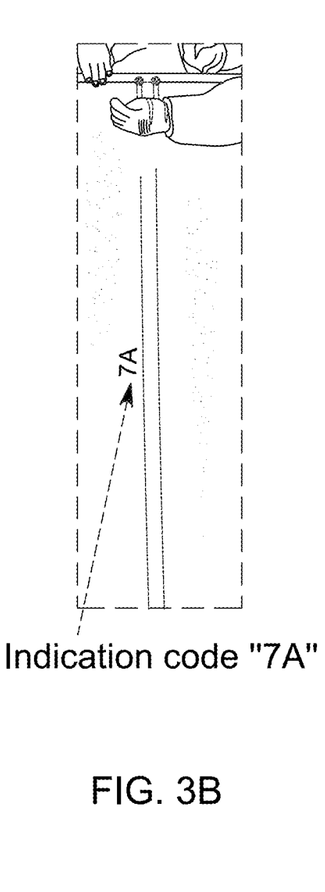
Figure 3C:
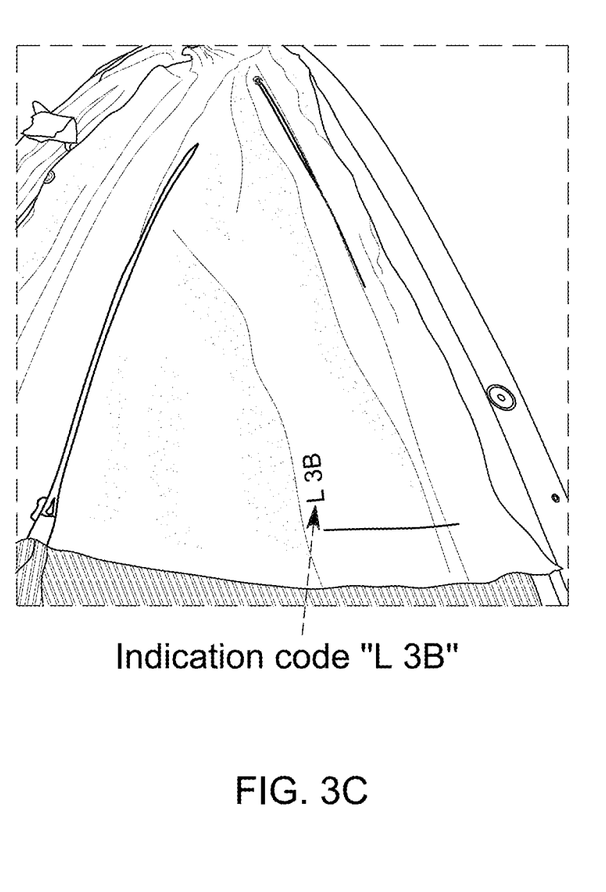
Figure 4:
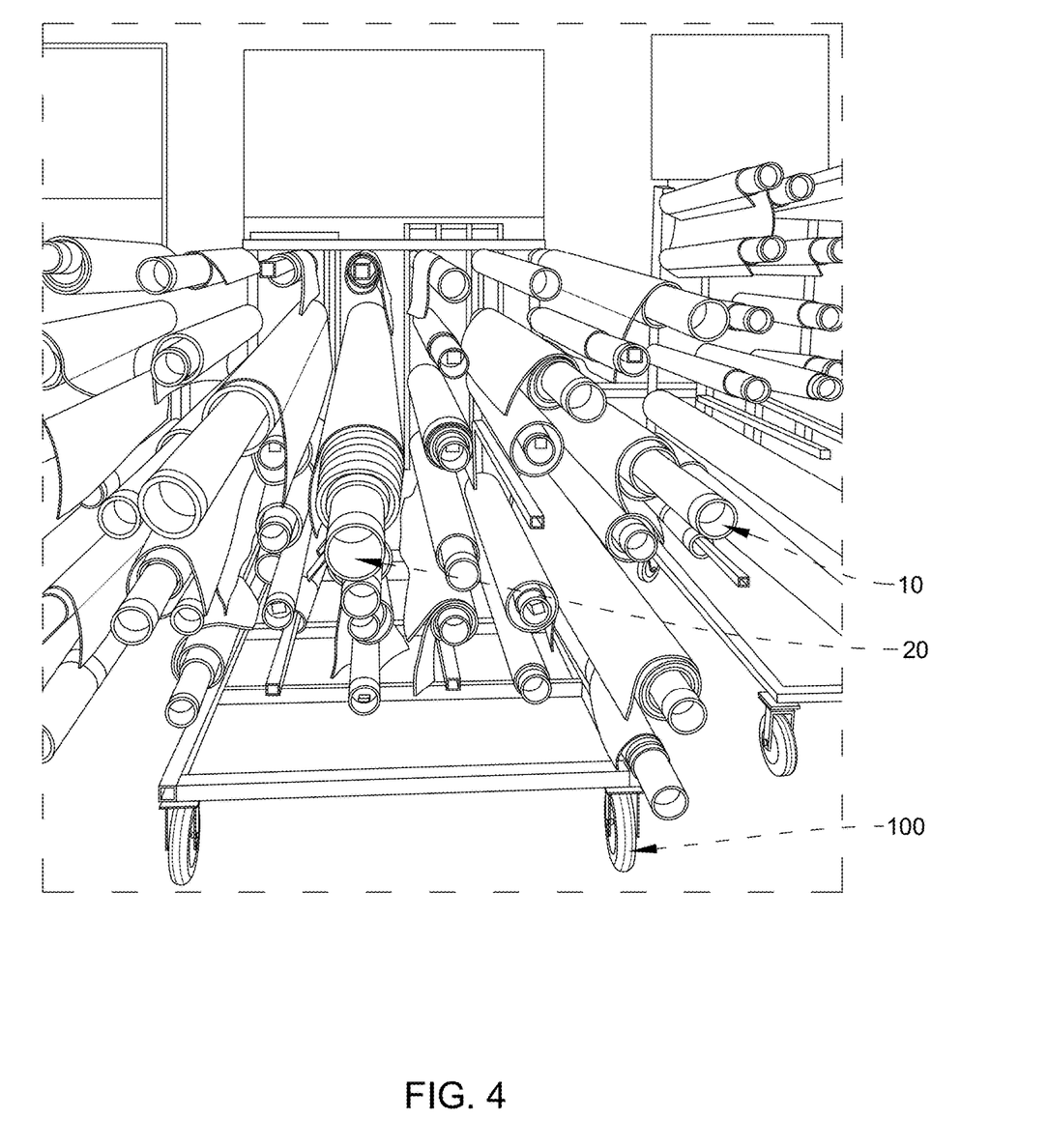
FIG. 4 is an image of an exemplary layup delivery cart.

FIGS. 3-4 depict an exemplary layup delivery mechanism, configured as a moveable cart 100 in FIG. 4. The layup delivery mechanism 100 includes a plurality of discrete holders, each designated to hold and dispense a supply (10, 20, etc.) of a specific layup material. The spindles (10, 20, etc.), of layup material can be distinguished based on a variety of parameters, e.g. material type, thickness of ply, spindle length, etc. Each holder is labeled with an identification code that corresponds to a layup projection label that is illuminated/depicted within the mold during the layup process.

For example, FIG. 3A depicts a layup projection within the root section of a mold in which the ply the identification code "6AB" is projected onto the mold (along with the boundaries/borders of that layup segment, shown in pink). This identification code "6AB" signals to the operator which holder of the layup delivery mechanism 100 includes the appropriate spindle of layup material is to be applied during this sequence. In use, the operator looks for the matching spindle label "6AB" on the layup delivery mechanism 100, obtains the desired layup segment, and then installs it into the mold such that the physical boundaries/borders of that layup segment match the projected boundaries (within the time frame allotted by the sequence projection).

Next, as shown in FIG. 3B, the operator observes the layup projection within the root section of a mold in which the ply the identification code "7A" is projected onto the mold (along with the boundaries/borders of that layup segment, shown in green). Similarly, the operator looks for the matching spindle label "7A" on the layup delivery mechanism 100, obtains the desired layup segment, and then installs it into the mold such that the physical boundaries/borders of that layup segment match the projected boundaries (within the time frame allotted by the sequence projection).

FIG. 3C, depicts an exemplary layup projection within the tip section of a mold in which the identification code "L 3B" is projected onto the mold (along with the boundaries/borders of that layup segment, shown in pink). Again, the operator would locate the similarly codified supply of layup material and select the appropriate size for installation into the mold such that the physical boundaries/borders of that layup segment match the projected boundaries (within the time frame allotted by the sequence projection).

As shown in FIG. 4, the layup delivery mechanism 100 can include a table of identification codes including numerous designation schemes (e.g. a prefix such as "L" can indicate Lower Mold, numbers—to indicate sequence order and/or location within the mold; colors—to convey additional information to the operator such as material type, relative complexity or sequence time interval, etc.).

In the current disclosed subject matter, the projection device/controller is equipped to automatically change the projection files following a pre-defined time interval scheme. These time slots are estimated based on the practice of the standard work for each process step (and in some embodiments can include a productivity time margin that is a function of parameters, e.g., the number of production team members, work shift and production team skill level). Using this margin, various cycle time patterns can be enforced in the production floor by projecting the layup patterns for the appropriate/sufficient time for the operator to complete installation of that layup segment, and then advancing to the next layup projection thereby ensuring the operator maintains the pace to adhere to the forecasted aggregate cycle time. At the end of the layup process, the total cycle time would be equal to the sum of all laser projection time intervals. Accordingly, the present disclosure allows for manufacturers to accurately forecast the total cycle time for blade layup, with certainty, and in advance of the start of the operation.

Automated projection of sequenced layup patterns not only sets the cycle time for production but also enforces the practice of standard work as it does not leave any room or degrees of freedom for the operators to switch the process steps or change the sequence order. This is a key element in achieving the consistency in manufacturing and to maximize the traceability which is critical for improving the quality of the blades.

In accordance with another aspect of the disclosure, in some embodiments a procedure can be incorporated for the case where production falls behind and fails to keep up with the automated projection pace (FIG. 1 step 7). This could be due to issues such as productivity problems or unexpected material quality issues. To cope with this situation, an alert system can be provided to the supervisor. In some embodiments, once activated, this signal stops the automatic projection immediately and the issue will be brought to the attention of the production supervisors. Once the issue is resolved, the projection can go back to match the ongoing sub-step and the automatic process is resumed.

In this regard, additional guidance can be provided to the operator to alert them of the impending risk of activating the alarm. For example, the layup patterns can be depicted with a visual cue (e.g. blinking, with increased frequency) to signal to the operator that the allotted time interval for that particular layup pattern is about to expire. Additionally or alternatively, select layup patterns can be outlined with a color-coded pattern at the outset to alert the operator that this particular layup pattern is afforded more/less time, has increased complexity, or requires some special action by the operator.

Therefore, and in accordance with the disclosed subject matter, the semi-automated layup process disclosed herein improves productivity and efficiency in production of molded composites, such as wind turbine blades (though it is to be understood the disclosed system and method can be employed for any molded composite structure). Further, the disclosed optimization method allows for enforcement of standard work procedures while facilitating the communication and material flow on the manufacturing floor.

While the disclosed subject matter is described herein in terms of certain preferred embodiments, those skilled in the art will recognize that various modifications and improvements may be made to the disclosed subject matter without departing from the scope thereof. Thus, it is intended that the disclosed subject matter include modifications and variations that are within the scope of the appended claims and their equivalents.

Moreover, although individual features of one embodiment of the disclosed subject matter may be discussed herein or shown in the drawings of the one embodiment and not in other embodiments, it should be apparent that individual features of one embodiment may be combined with one or more features of another embodiment or features from a plurality of embodiments.

The invention claimed is:

1. A system for fabrication of a composite structure comprising:

a mold, the mold having a contoured surface;

a layup projection generator, the layup projection generator:
  defines a plurality of mold sections;
  identifies the dimensions for a plurality of layup segments;
  specifies the sequence of layup segments within a first section of the mold;
  specifies the sequence of layup segments within a second section of the mold, the sequence of layup segments within the second section of the mold synchronized with the layup segments within a first section of the mold; and
a first projection device, the first projection device configured to visually depict the boundaries of a plurality of layup segments and indication codes onto the first section of the mold, and
a second projection device, the second projection device configured to visually depict the boundaries of a plurality of layup segments and indication codes onto the second section of the mold.

2. The system of claim 1, wherein the first projection device is configured to visually depict the plurality of layup segments in the first section of the mold, the first section of the old corresponding to a root portion of the blade.

3. The system of claim 2, wherein the first and the second projection devices simultaneously depict the boundaries of the plurality of layup segments onto the first section of the mold and the second section of the mold.

4. The system of claim 1, comprising a layup delivery mechanism, the layup delivery mechanism delivering a layup segment to at least one of the first or the second section of the mold.

5. The system of claim 1, wherein the first and the second projection devices sequentially depicts the boundaries of each layup segment onto the first and the second sections of the mold.

6. The system of claim 1, wherein the first section of the mold defines the root portion of a wind turbine blade.

7. The system of claim 1, wherein the second section of the mold defines the tip portion of a wind turbine blade.

8. The system of claim 1, wherein a density of layup segments in a first section of the mold is higher than the density of layup segments in a second section of the mold.

9. The system of claim 1, wherein the layup delivery mechanism for layup segments of the first section of mold is different from the layup delivery mechanism for layup segments of the second section of the mold.

10. The system of claim 1, wherein the layup projection generator is disposed above the mold.

11. The system of claim 1, wherein the layup projection generator and mold are configured for relative movement.

12. The system of claim 1, wherein the projection device projects the boundaries of layup segments via an optical laser.

13. A method of manufacturing a composite structure comprising:
  providing a mold, the mold having a contoured surface;
  providing a layup projection generator, the layup projection generator:
    defining a plurality of mold sections;
    identifying the dimensions for a plurality of layup segments;
    specifies the sequence of layup segments within a first section of the mold, the sequence of layup segments within the first section of the mold configured as a series of sub-tasks,
      each sub-task having a start and end, with an endpoint of the first sub-task occurring prior to start of the next sequential sub-task;
    specifies the sequence of layup segments within a second section of the mold, the sequence of layup segments within the second section of the mold synchronized with the layup segments within a first section of the mold;
    identifying a predetermined time interval scheme associated with the plurality of layup segments and the series of sub-tasks;
  projecting the boundaries of each of the plurality of layup segments and indication codes onto the first section of the mold and the second section of the mold for the predetermined time interval scheme;
  identifying a spindle having a material for the layup section associated with the indication code; and
  delivering a layup segment from the identified spindle to at least one section of the mold associated with the indication code.

14. The method of claim 13, wherein a first section of the mold defines the root portion of a wind turbine blade.

15. The method of claim 13, wherein a second section of the mold defines the tip portion of a wind turbine blade.

16. The method of claim 13, wherein layup segments within the first section of the mold are projected at a faster rate than layup segments within the second section of the mold.

17. The method of claim 13, wherein each layup segment within the first section of the mold includes a unique boundary projection.

18. The method of claim 13, wherein a plurality of layup segments within the second section of the mold remain projected onto the second mold section throughout at least two subtasks of a sequence within the first section of the mold.

19. The method of claim 13, wherein the cycle time for manufacturing the composite structure is defined based on the sequence of layup segments and the predetermined time interval scheme.

20. The method of claim 13, wherein the layup projection generator is disposed above the mold.

21. The method of claim 13, wherein the layup projection generator and mold are configured for relative movement.

22. The method of claim 13, further comprising generating an alert when delivering a layup segment does not keep pace with the predetermined time interval scheme associated with the layup segment.

* * * * *